United States Patent [19]

Sherman

[11] 4,420,183
[45] Dec. 13, 1983

[54] BODY LINER ASSEMBLY

[76] Inventor: Robert C. Sherman, 32 Waterside La., Clinton, Conn. 06413

[21] Appl. No.: 393,593

[22] Filed: Jul. 2, 1982

Related U.S. Application Data

[63] Continuation-in-part of Ser. No. 288,977, Jul. 31, 1981.

[51] Int. Cl.³ .............................................. B62D 33/04
[52] U.S. Cl. ...................................... 296/181; 52/479; 52/481; 296/39 R; 296/183
[58] Field of Search .................... 296/181, 183, 39 R; 52/479, 481, 777, 506, 764

[56] References Cited

U.S. PATENT DOCUMENTS 2,178,817 11/1939 Small ...................................... 52/479
3,393,920 7/1968 Ehrlich ................................ 296/181
3,986,313 10/1976 Nelsson ................................ 52/481
4,015,876 4/1977 Hulverson ........................... 296/181
4,059,936 11/1977 Lukens ................................... 52/764

Primary Examiner—Duane A. Reger
Assistant Examiner—John A. Carroll
Attorney, Agent, or Firm—Prutzman, Kalb, Chilton & Alix

[57] ABSTRACT

A cargo transport container body liner assembly is disclosed comprising a plurality of liner sheet elements mounted in adjoining disposition to form a smooth continuous interior wall with each liner element having a normally arcuate profile between its top and bottom portions and a first clamping apparatus for clamping the bottom portion of the liner elements to the support posts and a second clamping apparatus for clamping the top portion of the liner elements to the support posts and allowing vertical expansion and contraction of the liner elements.

13 Claims, 13 Drawing Figures

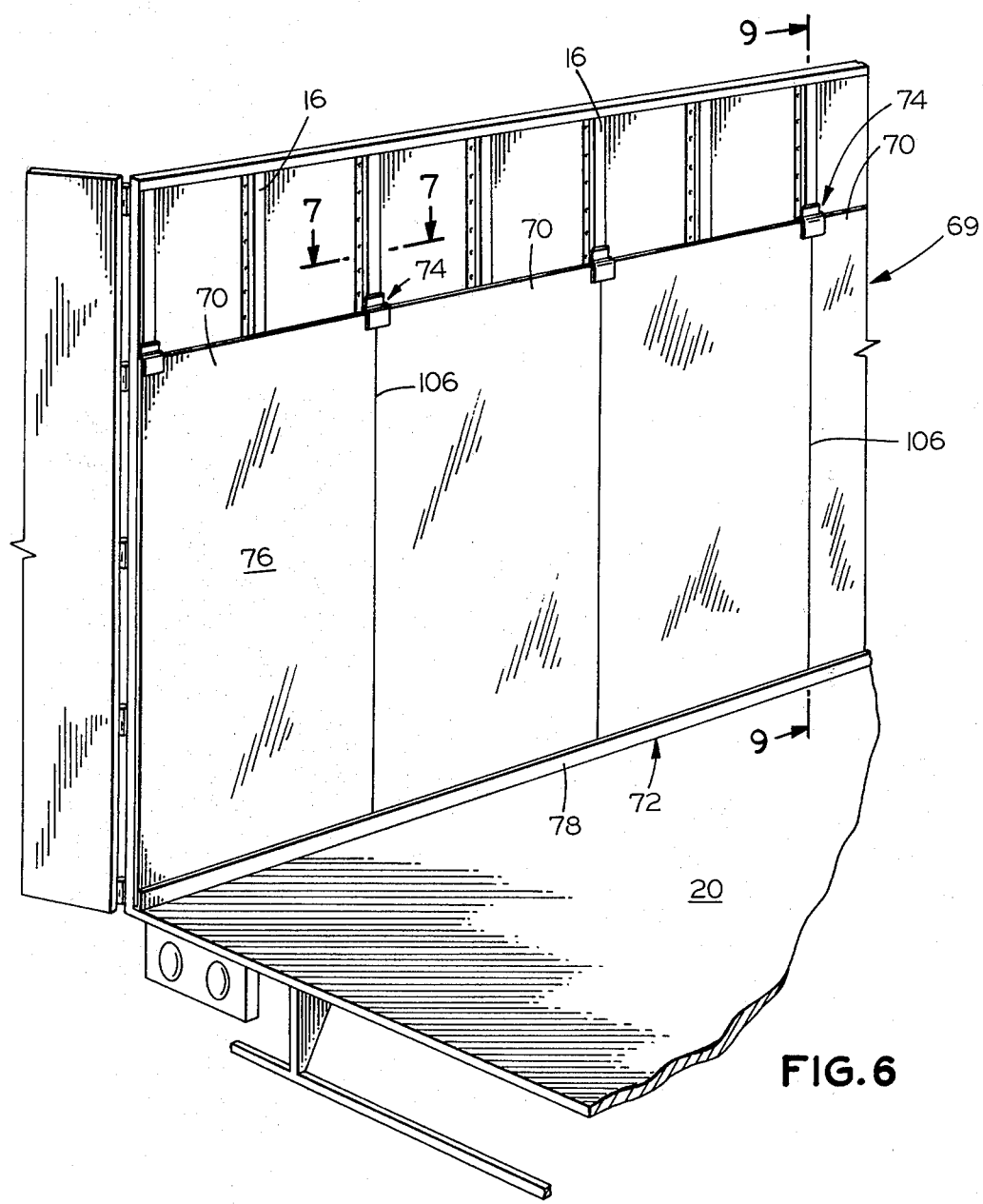
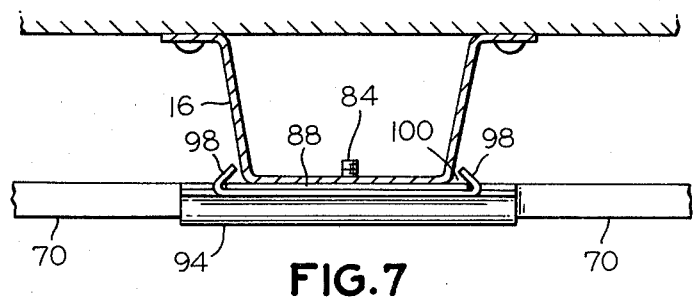

BODY LINER ASSEMBLY

This application is a continuation-in-part of copending U.S. Ser. No. 288,977 filed July 31, 1981.

BACKGROUND OF THE INVENTION

This invention relates to trailer and rigid body trucks and cargo containers, and more particularly to a body liner assembly for such trucks and containers.

Over the past decade, the transportation industry has gradually been converting their trailer and rigid body-type vehicles from the "exterior post" configuration to the streamlined "smooth-sided" configuration as offered by trailer and body manufacturers. This has been especially true since the energy crisis of 1973 focused increased emphasis and concern on energy conservation. Government, industry, and private sector testing has substantiated that smooth-sided vehicles increase fuel efficiency in highway or sustained speed operations in comparison with exterior post vehicles.

Tractor air deflectors and trailer (or body) aerodynamic nose mounted devices operate more efficiently with smooth-sided following vehicles as the increased air flow directed from the nose of the following vehicle can attach more readily to the trailer or body side. An additional benefit is obtained from the smooth-sided configuration in that the exterior surface is more suited for advertising and identification material than the discontinuous surface of the exterior post configurations.

Although the smooth-sided vehicle configuration has provided increased fuel efficiency, it has also heretofore created maintenance problems that have cancelled out any real dollar savings realized from the fuel efficiency. The maintenance problems have been especially prevalent with very large common carriers that operate many pieces of equipment on a round-the-clock basis. Specifically, the maintenance problems arise out of the configuration created when the posts are installed inside the vehicle and therefore present an irregular configuration in the vulnerable interior cargo space of the vehicle. If these posts are not covered with a smooth protective surface, they become prime targets for damage from forklifts utilized in the loading and unloading of freight. Damage to an interior post of a vehicle is both expensive and time consuming to repair.

Previously, the common practice was to span these posts with sheets of material by bolting or riveting the sheets to the post. Plywood of one-quarter inch thickness is believed to be the most common sheet material although metal is also utilized.

Commonly, the sheets are a standard four by eight foot size, the posts are normally two feet on centers, and the common practice is to rivet or bolt at one-foot intervals. Therefore, 27 rivets or bolts are used per sheet of liner.

Since plywood splinters and fractures easily, an additional liner is commonly fastened to the plywood at the lower portion of the trailer. This liner is usually a plastic material that affords a more slippery surface than the plywood. This plastic material is normally two feet in height and is installed fore-to-aft in the vehicle in a continuous length so as to avoid seams and joints that could be caught and torn by pallets, objects being loaded and unloaded, and the forklift itself. These bottom liners are fixed in the same manner as the plywood with rivets or bolts at one-foot intervals, both top and bottom. Thus, a 40-foot trailer would require 160 fasteners to install the bottom liner and would require 540 fasteners to install the plywood sheets for a total of 700 fasteners for a complete installation (which thus requires the drilling of 700 holes in the posts of the trailer). Thus, significant labor is expended in initial installation due to the use of these fasteners. Similarly, significant labor is required to replace damaged liners.

These numerous rivets or fasteners are susceptible to breakage or dislodging so as to extend outwardly in a protruding manner if the plywood sheets incur impact from a forklift or objects within the interior of the trailer. Impact forces on the sheets produce a "prying" reaction at the point of attachment to the post, i.e., the rivets or fasteners. This weakens, damages, or dislodges fasteners so as to cause the fasteners to protrude into the cargo space to catch on cargo and the forklift causing possible damage to the liner and posts. The dislodging of the fasteners can cause the plywood sheet and plastic liner to also protrude into the trailer body and subject them to inevitable damage. Thus, the dislodging of the fasteners or rivets produces a high risk maintenance condition.

Although the dislodging of the fasteners is a problem with both plywood and metal liners, the plywood liner also exhibits additional disadvantages. For example, the plywood is porous and even under the best manufacturing procedures tends to absorb moisture and gradually separate, splinter and fracture thereby requiring replacement. Additionally, the plastic bottom liner must be installed on the plywood in a continuous length to avoid seams and, therefore, if damage and replacement does occur, this liner must be replaced in total for the entire length of the vehicle. Because of its mass, plywood sheets inefficiently take up valuable cargo space and both plywood and metal are inefficient with respect to gross weight.

SUMMARY OF THE INVENTION

A body liner assembly for "interior post" bodies is disclosed comprising a plurality of extruded liner elements adapted to be mounted to the interior support posts in adjoining disposition with each liner element having a smooth inwardly disposed surface and a number of transversely extending studs connected to the outer surface to transfer impact forces to the posts and/or body, and fasteners to attach the liners to the posts. Each liner element exhibits an arcuate profile to facilitate mounting and minimize the number of fasteners.

An alternate body liner assembly includes a plurality of liner sheet elements with each liner element having top, middle and bottom portions, and inner and outer surfaces with the inner surface being smooth to face the interior of the trailer or container body. Each liner element has a normally arcuate profile between the top and bottom portions. A first clamping apparatus detachably clamps the bottom portion of each liner element against the interior posts and a second clamping apparatus detachably clamps the top portion of each liner element against the interior posts and allows vertical expansion and contraction of the liner elements. The arcuate profile of each liner element causes the top and bottom portions to bias inwardly toward the interior of the container body against the first and second clamping apparatus and causes the middle portion to bias outwardly toward the support posts. The liner elements are mounted in adjoining disposition to form a smooth continuous interior wall surface.

The first clamping apparatus includes a channel member extending longitudinally along the lower portion of the support posts rigidly connect to the container body with an upwardly opening channel to retain the bottom portion of the liner elements. The second clamping apparatus includes a clamping element having a first portion detachably mounted to the support post and a second portion offset from the first portion to form a channel between the second portion and the support post to receive and retain the top portion of the liner element. The channel extends sufficiently above the top portion of the liner element to allow for vertical expansion during temperature change.

It is a principal object of this invention to provide a new and improved body liner assembly for interior post trailer and rigid body vehicles and cargo containers.

It is also an object of the invention to provide an extruded integral body liner element that directs impact forces away from fastener connections.

Another object of the invention is to provide a body liner assembly that allows simple and expeditious replacement of individual body liner elements.

A further object of the invention is to provide strong resilient body liner assembly that is resistent to impact from cargo and forklifts.

A still further object of the invention is to provide a body liner element that minimizes the number of fastener elements necessary for mounting.

A still further object of the invention is to provide an alternate body liner element that eliminates bolt and rivet fasteners through the liner element.

Yet another object of the invention is to provide a body liner assembly that allows vertical expansion and contraction of the body liner element due to temperature change.

A still further object of the invention is to provide a body liner assembly that presents a relatively smooth interior surface.

A still further object of the invention is to provide a body liner element that is space and weight efficient.

A still further object of the invention is to provide a body liner assembly that is economical in installation, maintenance and repair.

A still further object of the invention is to provide a body liner element that is economical to manufacture, durable in use, and refined in appearance.

BRIEF DESCRIPTION OF THE DRAWINGS

FIG. 6 is a partially cut away perspective view of an alternate embodiment of body liner assembly mounted in a truck body;

FIG. 7 is an enlarged sectional view seen on line 7—7 of FIG. 6;

DESCRIPTION OF THE PREFERRED EMBODIMENT

Figure 1:
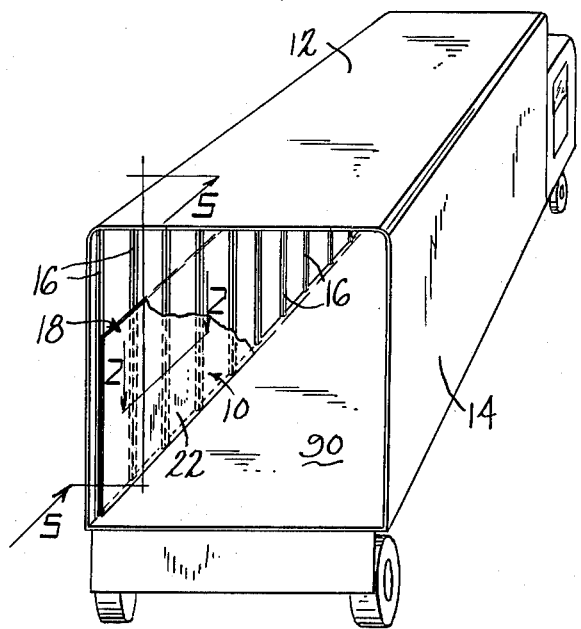
FIG. 1 is a partially cut away perspective view of the invention mounted in a truck body.

The body liner assembly of this invention is generally designated by the numeral 10 (FIG. 2) and is shown mounted to a truck body 12 in FIG. 1.

For purposes of explanation, truck body 12 is depicted as a rigid body vehicle although the invention is intended for utilization with all types of vehicles and transport containers having interior post configurations, e.g., a tractor trailer vehicle. Truck body 12 has a smooth outer surface 14 with the support posts 16 being located in the interior of the body. This type of configuration is referred to as a "smooth sided" vehicle or an "interior post" configuration.

Figure 2:
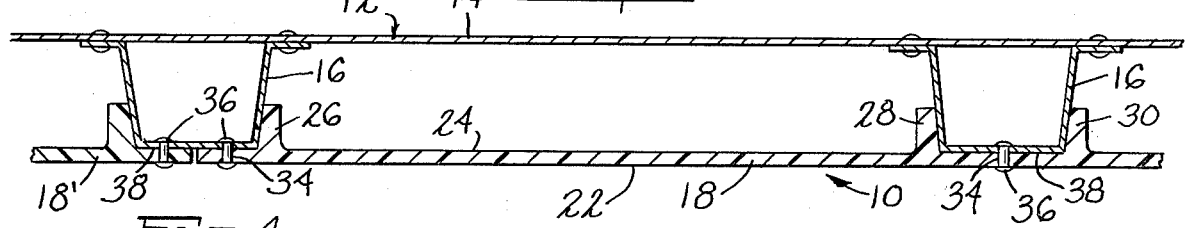
FIG. 2 is an enlarged sectional view seen on line 2—2 of FIG. 1.

Body liner assembly 10 is comprised of a plurality of liner elements 18 attached as shown in FIG. 2 to form a generally smooth interior surface in cargo space 20 of truck 12. Liner element 18 is preferably an extruded sheet member having a smooth interior surface 22 and an outer surface 24 having outwardly or transversely extending stops or studs 26, 28, 30 and 32 (not shown). Liner element 18 is preferably an extruded (or molded) material such as plastic or reinforced plastic so that the studs are an integral part of the liner element. While it is preferable that the studs be an integral part of the liner, it is also acceptable that these studs be distinct and rigidly attached to the liner. Other acceptable materials include aluminum or coated wood.

Liner element 18 contains a number of rivet-receiving apertures 34. Rivets 36 fasten the liner elements to the vertical or longitudinal ends 38 of posts 16. Longitudinal ends 38 are generally flat and adjoin the outer surface 24 of liner 18 as shown in FIG. 2. Rivet apertures 34 can be recessed so that rivets 36 blend with the smooth surface 22. Bolts, screws, fasteners, and other means for fastening or attaching the liner element to posts 16 may be utilized.

As shown in FIG. 2, stud 26 longitudinally adjoins the side wall 40 of post 16. In a similar manner, studs 28 and 30 straddle the side walls of the next adjacent post 16 and stud 32 longitudinally adjoins the side wall of the next-again post 16 (not shown). When fully mounted, the body liner assembly will comprise a plurality of liner elements 18 mounted end-to-end to form a continuous wall within the truck body with the individual liner elements abutting at the posts as shown by the abutment of liner element 18 and 18' in FIG. 2.

Figure 5:
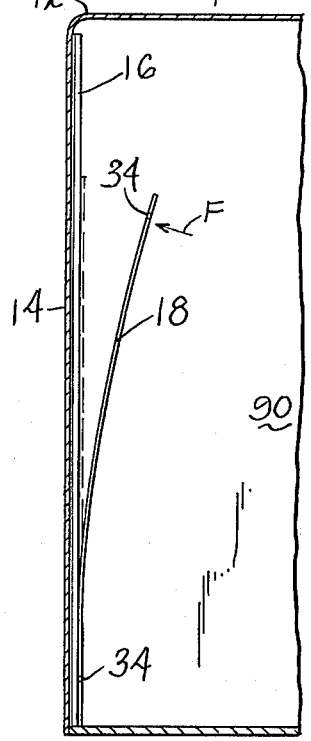
FIG. 5 is an enlarged sectional, partially cut away and partially diagrammatical, view seen on line 5—5 of FIG. 1.

In manufacturing, liner element 18 is extruded so as to exhibit an arcuate profile as shown in FIG. 5 and apertures 34 are positioned at the upper and lower portions. In mounting, the liner element is fastened at the lower portion and is forced against the post at the upper portion as depicted by arrow "F" (overcoming the inherent resistance of the material due to the arcuate configuration) for fastening to the post. The middle portion of liner 18 is compressed against the post due to the inherent resistive characteristics of the liner element being extruded in an arcuate configuration. Fasteners are therefore not required at the middle portion of the liner element to secure it to the post. In this manner, a four by eight foot liner element can be fastened with six rivets or bolts, and therefore six drilled holes in the posts as compared to 27 rivets and holes in the prior liners.

Thus, mounting is easily and economically accomplished with simple tools and a minimum amount of fasteners and drilling. Likewise, replacement is quickly accomplished by the replacement of individual liner elements for a minimization of "down time" of the truck and without an unnecessary expenditure of other materials.

In its environment of use, the interior surface of the liner element is inevitably subject to the force of impact from both forklift collisions and from contact with cargo in the loading/unloading process. These impact forces are directed against the posts 16 by the studs and are thus directed away from the rivets. Therefore, the impact forces do not tend to pry or dislodge the rivets. Without the studs, impact forces on the interior surface 22 would tend to cause an outward (with respect to body 12) movement or deflection of liner 18 at the point of impact and a corresponding inward movement at the adjacent points of attachment thereby tending to pry or dislodge the rivets. Accordingly, the occurrence of dislodged and damaged rivets is greatly reduced with this invention (which necessarily reduces damage to the liner and to cargo). The impact forces are also somewhat nullified by deflection off the smooth resilient surface of the extruded liner.

Figure 4:
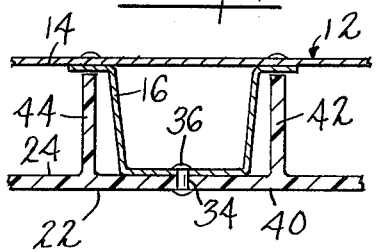
FIG. 4 is a view similar to FIG. 2 of an alternate liner element.

The liner element 40 shown in FIG. 4 is an alternate embodiment of this invention and, for purposes of explanation, similar elements are correspondingly numbered. Liner element 40 comprises transversely extending studs 42, 44, each having an outer end 43, which studs extend approximately the full depth of post 16 so that ends 43 are in adjoining disposition with truck body 12. Thus, liner element 40 transfers or directs any impact incurred on interior surface 22 to body 12 via studs 42, 44 as compared to liner element 18 which transfers the impact force to post 16.

Figure 3:
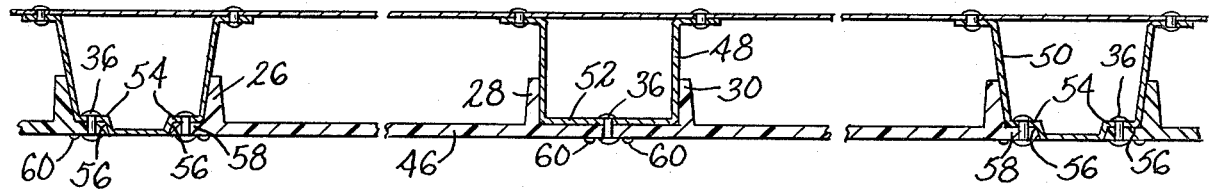
FIG. 3 is a view similar to FIG. 2 of an alternate interior post configuration.

Liner element 46 is a further alternate embodiment shown mounted to an interior post configuration consisting of alternating groups of support posts (FIG. 3). Post 48 is disposed between a pair of posts 50 to form a group for purposes of mounting liner element 46. Post 48 has a generally flat longitudinal end 52 while posts 50 have recessed longitudinal edges 54 to form a longitudinal or vertical seat portion 56 to receive the end 58 of liner 46 in nesting relationship. In this configuration, liner elements 46 abut with posts 50 to form a smooth continuous interior surface. Liner element 46 also comprises nodules 60 adjacent apertures 34 to protect any portion of rivets 36 that may protrude slightly from the interior surface of the liner element.

An alternate embodiment of body liner assembly generally designated by the numeral 69 is shown mounted in truck body 12 in FIG. 6. Liner assembly 69 generally comprises a plurality of liner sheet elements 70 mounted in adjoining disposition by a lower clamp assembly generally designated by the numeral 72 and an upper clamp assembly generally designated by the numeral 74. As will be seen, liner elements 70 are detachably mounted to support posts 16 without the necessity of rivets, bolts, or other fasteners passing through the liner element.

Liner sheet element 70 is a rectangular sheet having an arcuate profile between its top and bottom portions similar to the arcuate profile of liner element 18 in FIG. 5. The liner element 70 has a smooth inner surface 76 which faces the interior of cargo space 20. Liner element 70 may be comprised of "foamed" plastic or solid plastic, and the degree of curvature will in part be dependent upon the specific composition of the liner material. Foamed plastic would provide a lighter liner element than a solid plastic. Other acceptable materials may be utilized.

Figure 9:
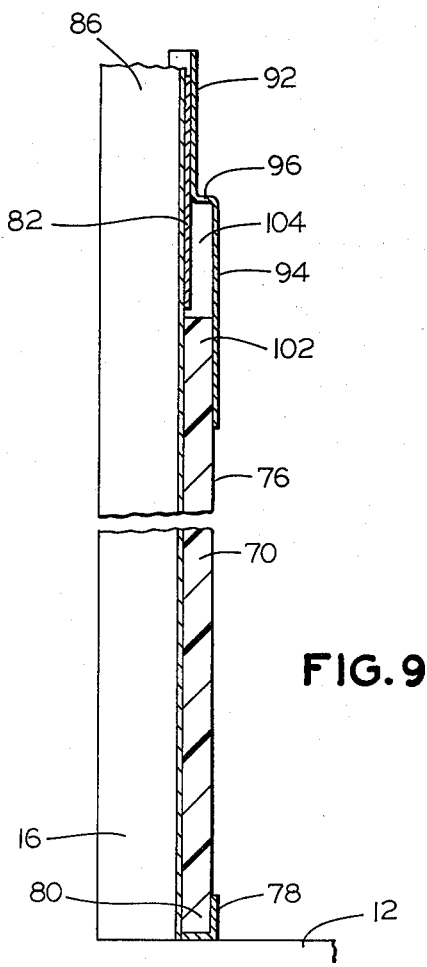
FIG. 9 is a partially broken away sectional side view seen on line 9—9 of FIG. 6.

The lower clamp assembly 72 comprises an elongated channel member 78 extending longitudinally along the lower portion of the support posts 16 as shown in FIG. 6. Channel member 78 is rigidly attached to truck body 12 with the channel opening upwardly to receive and retain the bottom portion 80 of liner element 70 as shown in FIG. 9. The channel member may be a separate element rigidly mounted to the truck body or the channel can be integrally formed in the truck body. Other alternate means for detachably clamping the bottom portion of the liner element against the support posts 16 are also acceptable.

Figure 8:
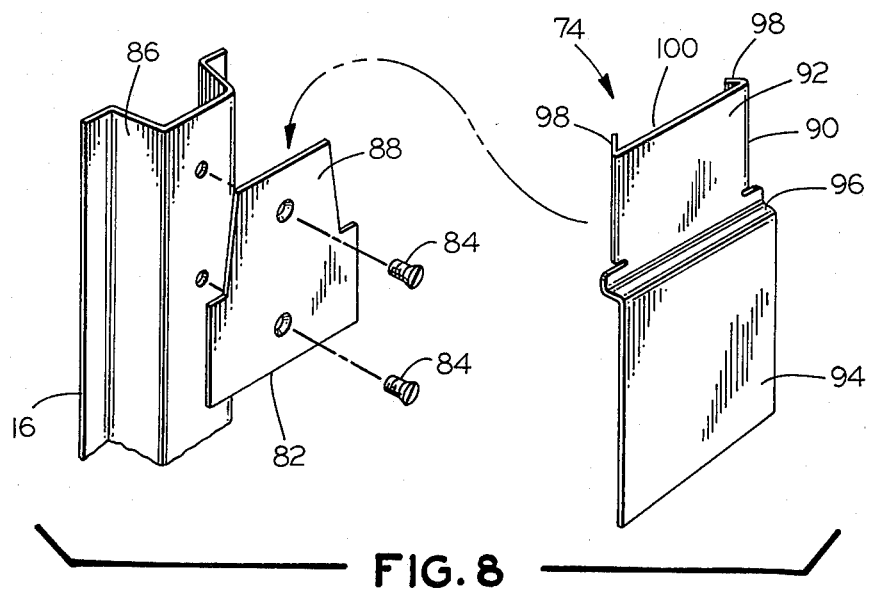
FIG. 8 is an enlarged exploded perspective view of the upper clamping apparatus of FIG. 7.

As shown in FIG. 8, upper clamp assembly 74 is comprised of mounting bracket 82 rigidly connected by threaded fasteners 84 to the upper portion 86 of support post 16. Mounting bracket 82 is an inverted "T" shape with an elongated leg or tongue portion 88 longitudinally aligned with support post 16.

Clamping assembly 74 also includes clamp element 90 having an upper portion 92 connected to a clamping leg 94 by shoulder 96. As shown in FIG. 8, the side edges of upper portion 92 have angled tabs or edges 98 which form a groove or slot 100 therein to slideably mount upon the upstanding tongue portion 88 of mounting bracket 82. The mounting of tongue portion 88 within groove 100 is best seen in FIG. 7.

Clamping leg 94 is offset from upper portion 92 by shoulder 96 as shown in FIG. 9. Upon mounting clamp element 90 to bracket 82, clamping leg 94 extends downwardly in spaced apart disposition from support post 16 so as to form a channel between the support post 16 and clamping leg 94 to receive and retain the top portion 102 of liner element 70 between clamping leg 94 and support post 16. As shown in FIG. 9, clamping leg 94 engages the smooth inner surface 76 of liner element 70, yet provides a vertical space 104 above the top portion 102 of liner element 70 to allow for vertical expansion of the liner elements due to temperature change. The amount of vertical space required is dependent upon the specific composition of the liner sheet.

It is preferable that liner sheet element 70 be a plastic material although other acceptable materials such as sheet metal may be utilized. Since trailer trucks and cargo containers often experience substantial changes in temperature, the material of the liner elements is subject to expansion and contraction with the temperature change. While the expansion characteristics of the plastic material (i.e., coefficient of expansion) can be controlled to conform within acceptable tolerances to the expansion characteristics of the support posts and mounting hardware, such plastic is costly to manufacture. If the expansion characteristics of the liner elements are not controlled relative to the support posts and mounting hardware, the use of fasteners passing through the liner element, such as rivets, may cause damage or tearing of the liner element or breakage of the fasteners upon expansion and contraction due to temperature change.

In the present invention, the upper and lower clamping assembly combine to allow the liner element to "float" in the sense of expanding and contracting as a result of temperature change, yet the liner element is compressed against the support posts to provide a smooth continuous inner wall surface. The vertical space 104 above the liner element in FIG. 9 is of sufficient size to permit vertical expansion of the liner element yet still provide the desired clamping retention. Thus, an economical plastic composition can be utilized without closely conforming to the expansion characteristics of the container materials. Additionally, by extruding the liner element 70 longitudinally, the primary direction of expansion of the liner elements will be longitudinal, i.e. vertically as viewed in FIG. 9.

In mounting the body liner assembly, the bottom portion 80 of liner element 70 is inserted within channel member 78. As previously described with respect to liner element 18, the upper portion of the liner element is forced against the support post 16 as illustrated in FIG. 5 to overcome the inherent resistance of the material due to the arcuate configuration. Upon pressing the liner element against the support post, clamp element 90 is slideably mounted upon mounting bracket 82 so that clamping leg 94 retentively engages the smooth inner surface 76 of liner element 70. Although the dimensions and configuration of clamping assembly 74 do not necessarily have to provide a close tolerance fit with liner element 70, the normally arcuate shape of the liner element causes the bottom portion 80 and top portion 102 to press or bias against the respective clamp assemblies. The normally arcuate profile also causes the middle portion of liner element 70 to compress against support post 16. As shown in FIG. 6, the liner elements are mounted in adjoining end to end disposition to form a smooth continuous wall surface with an upper clamp assembly 74 being located at the common edge 106 of adjoining liner elements to clamp adjoining liner elements.

Thus, a body liner assembly is provided without the necessity for threaded fasteners or rivets through the liner element that can become dislodged from impact forces on the liner elements. The liner assembly is quickly and easily installed without the necessity for special tools.

To replace a liner element 70, the clamp element 90 is slideably disengaged from mounting bracket 82 with a mallet or prying tool, and the liner element is simply removed from the channel member 78 and replaced by a new liner element. Thus, repair and replacement are quickly and easily accomplished without the necessity for specialized tools such as air chisels, rivet guns, and related equipment or added labor for chipping and removing threaded fasteners or rivets. Importantly, a damaged liner element can be replaced anywhere by a single person using common tools. The vehicle or container need not be moved to a location where specialized tools are available and therefore the loss of operational time is minimized.

Figure 10:
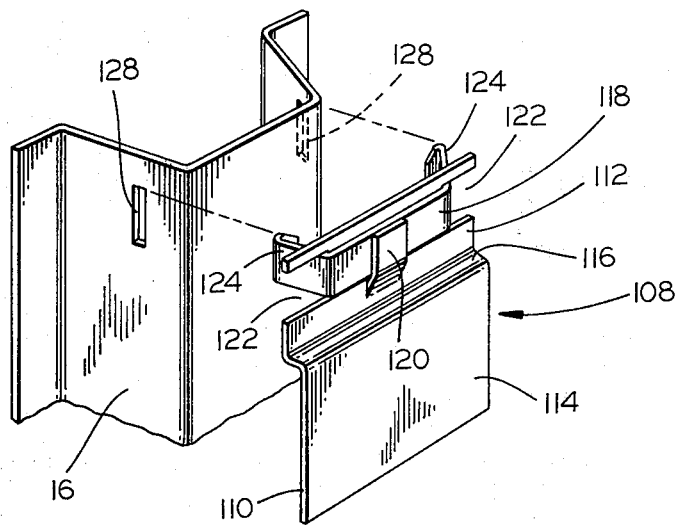
FIG. 10 is an enlarged exploded perspective view similar to FIG. 8 of an alternate clamping apparatus.
Figure 11:
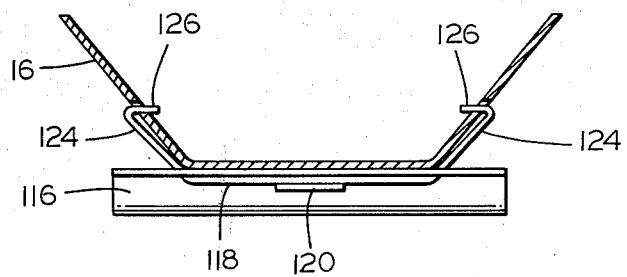
FIG. 11 is an enlarged top sectional view of the clamping assembly of FIG. 10 mounted to a support post.

An alternate clamp assembly is shown in FIG. 10 and is generally designated by the numeral 108. Upper clamp assembly 108 comprises a clamp element 110 having an upper portion 112 connected to an offset clamping leg 114 by a shoulder 116. A retaining clip 118 is mounted to upper portion 112 by tab 120 and constrained by edge slots 122 as shown in FIG. 10. Retaining clip 118 has a pair of opposing end tabs 124 with each tab having a retaining lip 126 as shown in FIG. 11. A pair of oppositely disposed apertures 128 in support post 16 are adapted to retentively receive the retaining lips 126 of tabs 124 to detachably mount clamp element 110 to support post 16.

When clamp element 110 is so mounted to support post 16, clamping leg 114 extends downwardly in spaced apart disposition from support post 16 to retain the upper portion 102 of liner element 70 between clamping leg 114 and support post 16 in a manner similar to clamp element 90. Also in a similar manner, clamping leg 114 engages the smooth inner surface 76 of liner elements 70 and the normally arcuate profile of liner element 70 causes the top and bottom portions to be biased against the clamp assemblies. Similarly, shoulder 116 is vertically spaced from the top portion 102 of liner element 70 to allow for vertical expansion and contraction of the liner element.

To mount the body liner assembly, the liner elements are inserted within channel member 78 and the top portion is forced against the support post 16. The retaining clips 126 are then forcibly inserted within apertures 128 to place clamping leg 114 in retentive contact with the smooth surface 76 of liner element 70. Retaining clip 118 is preferably comprised of spring metal and is removeable from apertures 128 by a number of common tools to allow quick and easy disassembly and replacement of liner elements. It is understood that other acceptable types of retaining clips as well as upper clamp assemblies may be utilized to retain the normally arcuate liner elements in place without the use of threaded fasteners, rivets, etc.

While it is not necessary to employ transverse stops or studs on the outer surface of liner elements 70 since fasteners are not utilized, it may be desirable in certain applications to include such studs adjacent support posts 16 to prevent the inward movement of the vertical edges of the liner elements upon the occurrence of impact. For example, impact against the smooth inner surface 76 may cause a temporary inward movement of a vertical edge and this vertical edge that could catch upon moving cargo or a forklift. This could result in damage to the cargo or damage to the liner element. The provision of studs at the vertical edges adjacent the support post 16 would transfer any such impact forces away from the vertical edge to the support post and prevent such temporary dislodgement.

Figure 12:
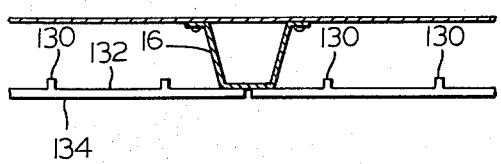
FIG. 12 is an enlarged sectional view similar to FIG. 4 of a liner element with vertical ribs.
Figure 13:
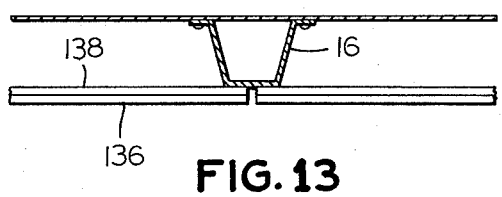
FIG. 13 is a view similar to FIG. 12 of a liner element with horizontal ribs.

Referring to FIG. 12, there is another embodiment of liner element with a plurality of spaced apart vertically disposed ribs 130 on the outer surface 132 of liner element 134. Ribs 130 are an integral part of liner element 134 and provide additional rigidity to allow utilization of a thinner liner element. The ribs 130 are located on outer surface 132 in a configuration so as to avoid support posts 16 as shown in FIG. 12. In FIG. 13, liner element 136 has a plurality of horizontally extending spaced apart ribs 138 for additional rigidity, and are in contact with support posts 16.

It will be apparent that the different features illustrated in connection with the several embodiments of the invention disclosed above may be utilized and incorporated in other embodiments as desired. As will be apparent to persons skilled in the art, various modifications, adaptations and variations of the foregoing specific disclosures can be made without departing from the teachings of the present invention. Thus it can be seen that this device accomplishes at least all of its stated objectives.

What is claimed is:

1. In a cargo transport container body having an outer shell with vertical side walls and a plurality of spaced-apart vertical interior support posts, a body liner assembly comprising
   a plurality of liner sheet elements each having top, middle and bottom portions, and inner and outer surfaces with said inner surface being smooth to face the interior of the container body, each said liner element having a normally arcuate profile between said top and bottom portions,
   first means for detachably clamping said bottom portion of said liner elements against said support posts, and
   second means for detachably clamping said top portion of said liner elements against said support posts and for allowing vertical expansion and contraction of said liner elements, said arcuate profile of each liner element causing said top and bottom portions of said liner element to bias inwardly toward the interior of the container body against said first and second clamping means respectively and said middle portion to bias outwardly toward said support posts,
   said plurality of liner elements being mounted in adjoining disposition to form a smooth continuous interior wall surface.

2. The container body of claim 1 wherein said first clamping means comprises a channel member extending longitudinally along the lower portion of said support posts and rigidly connected to said container body, said channel member having an upwardly opening channel to receive and retain said bottom portion of said liner elements.

3. The container body of claim 1 wherein said second clamping means comprises a clamp element having
   a first portion detachably mounted to said support post, and
   a second portion offset from said first portion to form a channel between said support post and said second portion to receive said top portion of said liner element with said second portion engaging said inner surface of said liner element, said channel extending sufficiently above said top portion of said liner element to allow vertical expansion of said liner element.

4. The container body of claim 1 wherein said outer surface of each said liner element has a number of outwardly extending studs to transfer impact forces inflicted on said inner surface of said liner element away from the vertical side edges of said liner elements.

5. The container body of claim 1 wherein each said liner element is an extruded integral sheet.

6. The container body of claim 1 wherein each said liner element has a plurality of spaced apart horizontally extending rib elements on said outer surface.

7. The container body of claim 1 wherein each said liner element has a plurality of spaced apart vertically extending rib elements, said rib elements being disposed remote from said support posts.

8. In a cargo transport container body having an outer shell with vertical side walls and a plurality of spaced-apart vertical interior support posts, a body liner assembly comprising,
   a plurality of liner sheet elements each having top, middle and bottom portions, and inner and outer surfaces with said inner surface being smooth to face the interior of the container body, each said liner element having a normally arcuate profile between said top and bottom portions,
   first means for detachably clamping said bottom portion of said liner elements against said support posts, and
   second means for detachably clamping said top portion of said liner element against said support posts and for allowing vertical expansion and contraction of said liner elements, said second clamping means having a mounting bracket rigidly connected to the upper portion of said support post and a clamping element having an upper portion detachably mounted to said bracket and a downwardly extending leg in spaced-apart disposition from said support post to retain said liner element between said leg and said support post, said arcuate profile of each liner element causing said top and bottom portions of said liner element to bias inwardly toward the interior of the container body against said first and second clamping means respectively and said middle portion to bias outwardly toward said support posts,
   said plurality of liner elements being mounted to adjoining disposition to form a smooth continuous interior wall surface.

9. The container body of claim 8 wherein said mounting bracket has an elongated tongue portion and said clamping element has a slot portion to slideably mount upon said tongue portion of said bracket.

10. The container body of claim 8 wherein
    said leg abuts the inner surface of said liner element to retain said liner element against said support post,
    said clamping element has a shoulder extending between said upper portion and said leg, and
    said shoulder is in sufficient spaced-apart disposition to said top portion of said liner element to allow vertical expansion of said liner element toward said shoulder.

11. In a cargo transport container body having an outer shell with vertical side walls and a plurality of spaced-apart vertical interior support posts, a body liner assembly comprising
    a plurality of liner sheet elements each having top, middle and bottom portions, and inner and outer surfaces with said inner suface being smooth to face the interior of the container body, each said liner element having a normally arcuate profile between said top and bottom portions,
    first means for detachably clamping said bottom portion of said liner elements against said support posts, and
    second means for detachably clamping said top portion of said liner elements against said support posts and for allowing vertical expansion and contraction of said liner elements, said second clamping means having a clamp element with an upper portion for mounting to said support post, a retaining clip connected to said upper portion to retentively engage said support post, and a leg connected to said upper portion and extending downwardly in spaced-apart disposition from said support post to retain said liner element between said leg and said support post, said arcuate profile of each liner element causing said top and bottom portions of said liner element to bias inwardly toward the interior of the container body against said first and second clamping means respectively and said middle portion to bias outwardly toward said support posts, said plurality of liner elements being mounted in adjoining disposition to form a smooth continuous interior wall surface.

12. The container body of claim 11 wherein said support post contains spaced-apart apertures to receive a retaining clip and said retaining clip has a pair of opposing tabs with each tab having a retaining lip, each said lip extending into an aperture to retentively engage said support post.

13. The container body of claim 11 wherein
said clamp element has a shoulder extending between said upper portion and said leg,
said leg abuts the inner surface of said liner element to retain said liner element against said support post, and
said shoulder is in spaced-apart disposition to said top portion of said liner element to allow vertical expansion of said liner element toward said shoulder.

* * * * *